Dec. 7, 1926.  
A. M. COX  
1,609,400  
SPEED INDICATOR AND THE LIKE INSTRUMENT  
Filed Nov. 5, 1923  
6 Sheets-Sheet 4
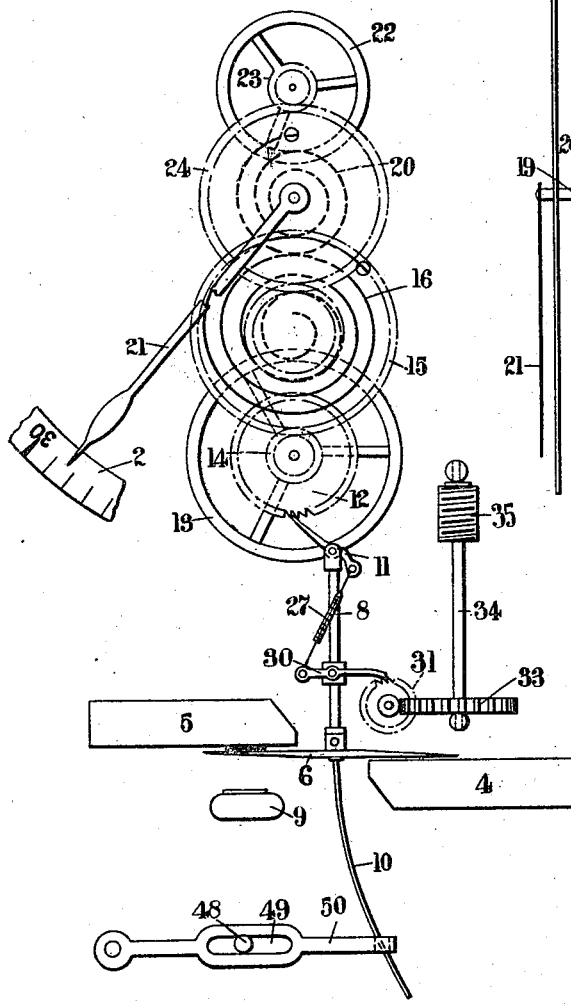
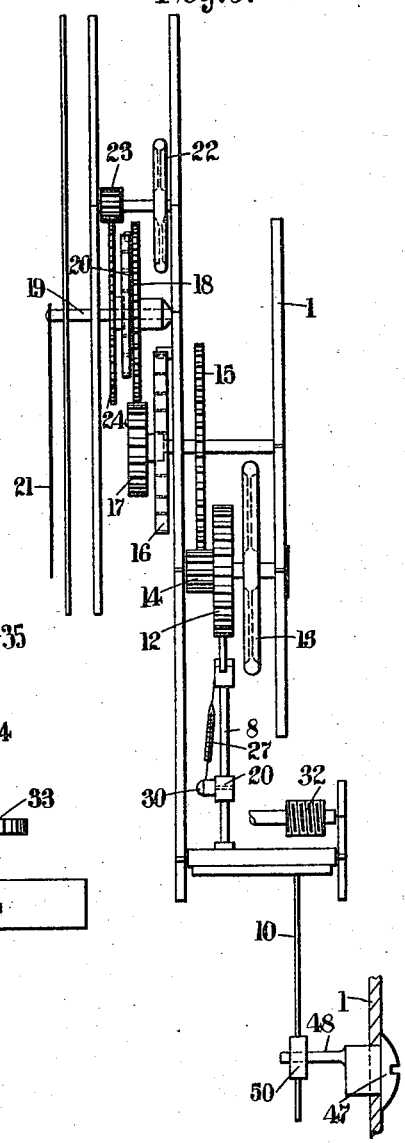
INVENTOR  
A.M.Cox  
Atty Dec. 7, 1926.  
A. M. COX  
1,609,400

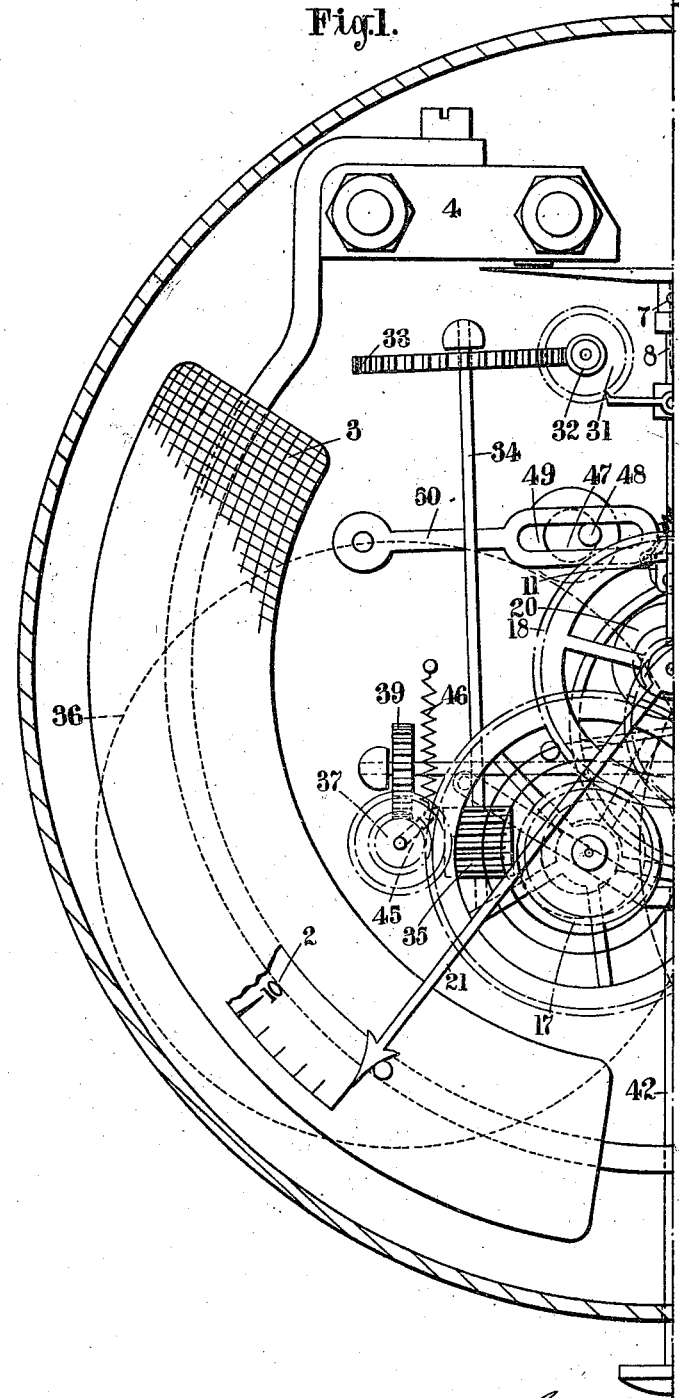

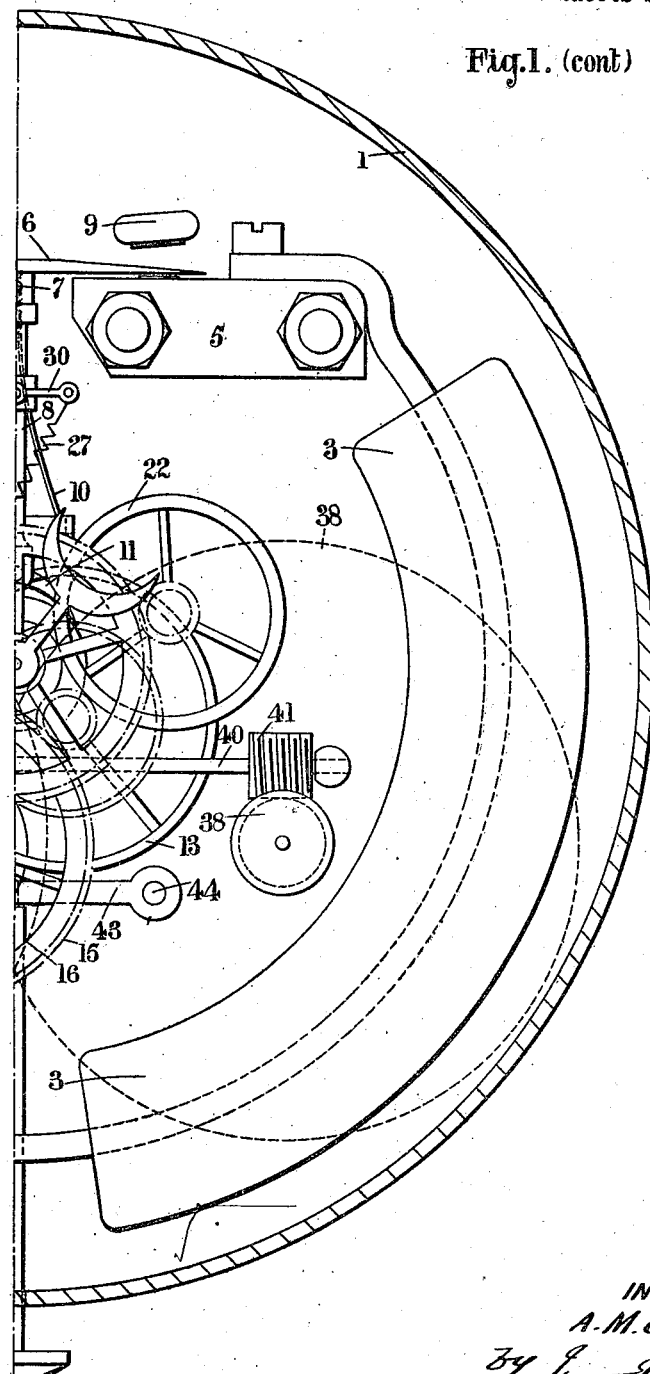

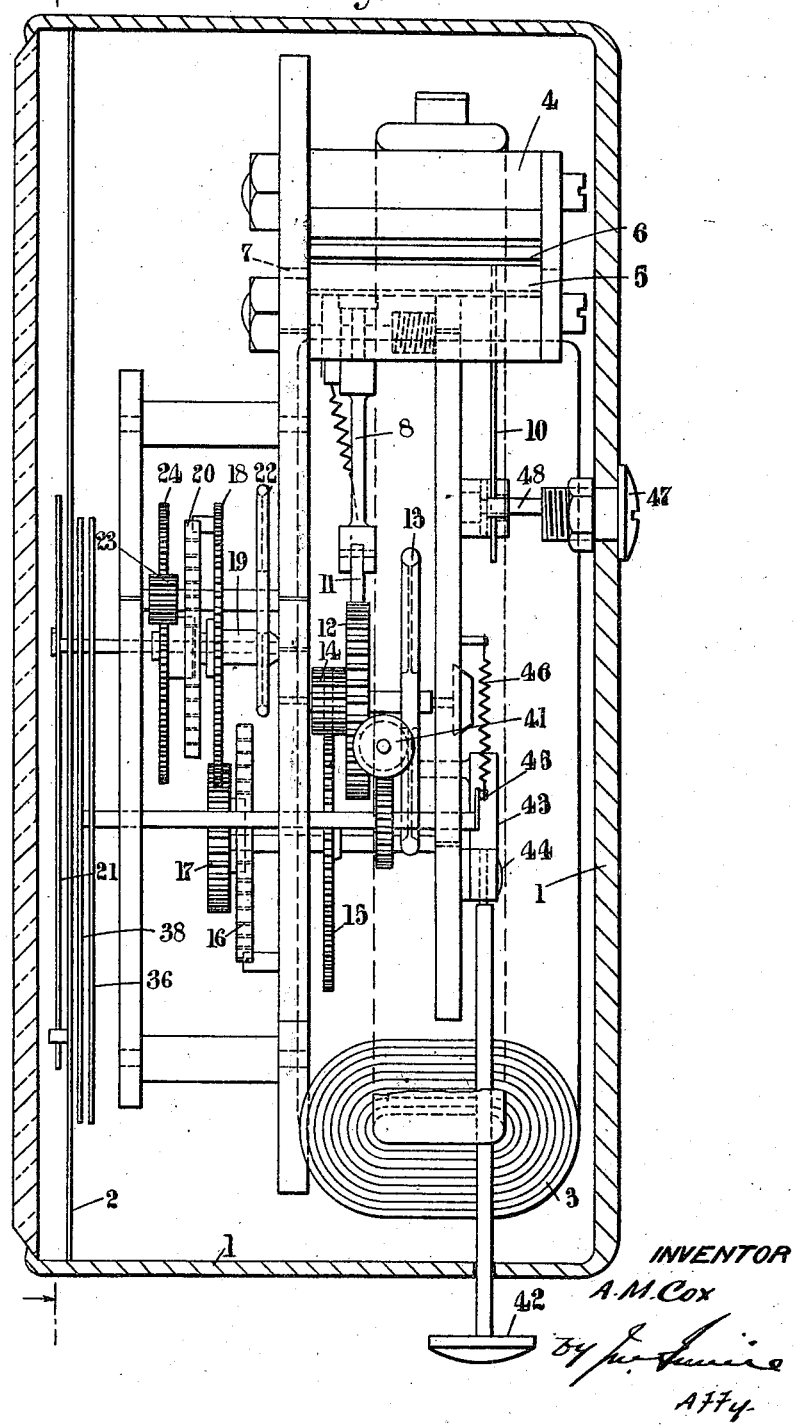

SPEED INDICATOR AND THE LIKE INSTRUMENT

Filed Nov. 5, 1923   6 Sheets-Sheet 5

INVENTOR  
A. M. Cox

Dec. 7, 1926. 1,609,400
A. M. COX
SPEED INDICATOR AND THE LIKE INSTRUMENT
Filed Nov. 5, 1923    6 Sheets-Sheet 6

INVENTOR
A. M. Cox
By _____
Atty.

Patented Dec. 7, 1926.

1,609,400

UNITED STATES PATENT OFFICE.

ARTHUR MACDONALD COX, OF EALING, ENGLAND.

SPEED INDICATOR AND THE LIKE INSTRUMENT.

Application filed November 5, 1923. Serial No. 673,043, and in Great Britain November 6, 1922.

This invention relates to electrical speedometers, which, if desired, may be combined with an odometer dial and a total indicator.

One of the objects of the present invention is to provide a speedometer of which the power for operating the same remains constant irrespective of the variation of the current or voltage utilized to effect the operation thereof.

Another object of the invention is to provide an electromagnetic device for the operation of the speedometer which is simple in construction and operation and which does not require any external source of current.

A further object of the invention is to provide a speedometer which is capable of use for any length of time and of which the electrical actuating portion has no parts which are liable to fail during operation.

A still further object of the invention is to so arrange the armature, which actuates the indicating mechanism, that it drives the indicating mechanism when operated mechanically whereas it is released from the actuating mechanism when attracted by its electromagnet.

These and other objects will be attained by the construction of a speedometer of which a preferred form will now be described with reference to the accompanying drawings, wherein:

Fig. 1 is a general front view of the mechanism.

Fig. 2 is a side view partly in section of the same mechanism.

Figs. 3 and 4 are diagrammatic views of the chief parts of the movement.

Figure 5:
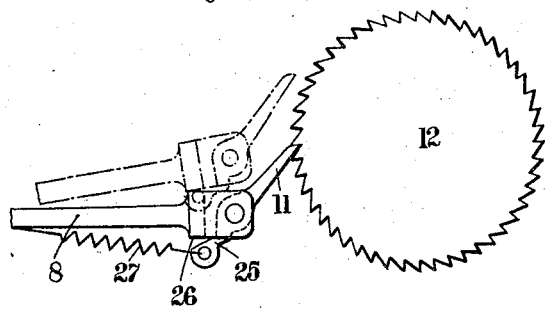
Fig. 5 shows a detail connected with the click movement.

Referring more particularly to Figs. 1 and 2 the instrument is mounted in a case 1 on which a dial 2, part only of which is seen, is mounted.

Inside the case I mount the electro-magnet 3 having poles 4 and 5 between which is an armature 6 pivoted at 7 and carrying an arm 8. The armature has limited rocking movement between the poles and a stop 9. Attached to the pivot 7 is a spring 10 tending to keep the armature away from the poles. The tension of this spring can be adjusted as hereinafter described. The arm 8 carries a spring-controlled click 11 adapted to engage a ratchet wheel 12 on the spindle of a balance wheel 13 on which is also a pinion 14 in mesh with a toothed wheel 15, see Figs. 3 and 4. This wheel 15 carries the recoil spring 16 and has on its spindle a pinion 17 in mesh with a toothed wheel 18 loosely mounted on spindle 19 and connected thereto by a hair or coil spring 20 through which the movements of the wheel 18 are conveyed with minimum oscillation to the pointer 21 which moves over the dial 2. The action of the spring is damped by a balance wheel 22 connected by pinion 23 to the wheel 24 fixed on the spindle 19.

Upon momentary energizing of the magnet 3 the armature is rocked against the tension of spring 10 and through arm 8 causes the click 11 to engage ratchet wheel 12. When de-energizing occurs the spring 10 returns the arm 8 and causes the click to drive the ratchet wheel 12 and the train of wheels through to the pointer. The movement of the click being continued until it frees itself from the ratchet wheel and permits the ratchet wheel and the train of wheels to return under the influence of the spring 16.

In its movements the click is controlled by a spring and suitable stops. A preferred method is that shown in Fig. 5 in which the click has a lug 25 coacting with a face 26 on the end of the arm 8. Spring 27 tends to bring the lug and the face together and hold the click in the position seen by dotted lines in Fig. 5. It will be noted from the construction that the click in its operative movement finally overruns and thereby releases the ratchet wheel 12 which when released starts to return under the influence of the spring 16. On energizing of the electro-magnet, the click is also moved in this return direction, and during such return movement reengages by means of the spring 27 with the ratchet wheel and returns with the latter to the driving position. The click is thus placed in such relation to the ratchet as to again drive the latter on cessation of the electrical impulse.

It will be understood that the oscillations of the armature are rapid and as a result of this the engagements of the click in the ratchet wheel are such that it thrusts the said wheel around against the spring 16 until the tension of the spring is in balance with the speed of the click movements and the rotations of the train of wheels is in equilibrium with the pointer over the appropriate position on the scale 2.

For odometer reading I mount a pawl 30 on the arm 8 and cause it to drive a ratchet wheel 31 on the spindle of which is a worm 32 adapted to drive worm wheel 33 on spindle 34 furnished with a worm 35 adapted to rotate the odometer dial 36. The spindle of the dial carries a worm 37 adapted to drive total indicator 38 through wheels 39, spindle 40 and worm 41.

For the purpose of zeroizing the odometer 36 I provide a plunger 42 the inner end of which is connected to lever 43 pivoted at 44 and by which the free end of the lever can be pressed against spindles 40 and 34 thus removing wheel 39 and worm 35 from the dial 36 which is returned to zero by an overhung pin 45 and its spring 46.

For the purpose of adjusting the instrument to suit different vehicles it is only necessary to adjust the tension of the spring 10 and for this purpose I provide an external screw 47 (Fig. 2) having an eccentric pin 48 in engagement with a slot 49 in a lever 50 through a hole in which the spring 10 is passed, see Figs. 3 and 4.

Figure 6:
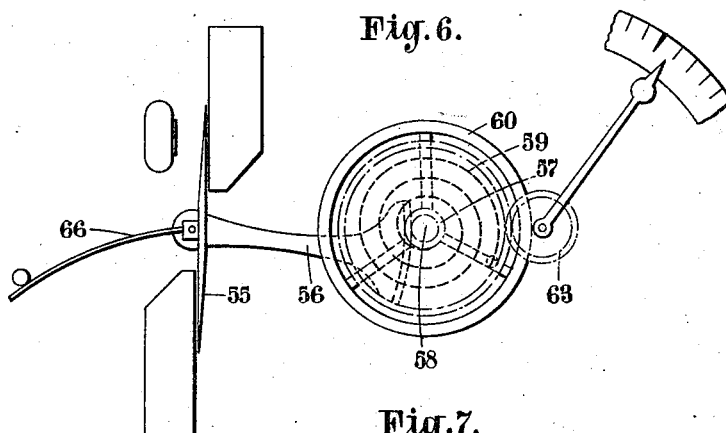
Figs. 6 and 7 show two views of an alternative construction of the movement.
Figure 7:
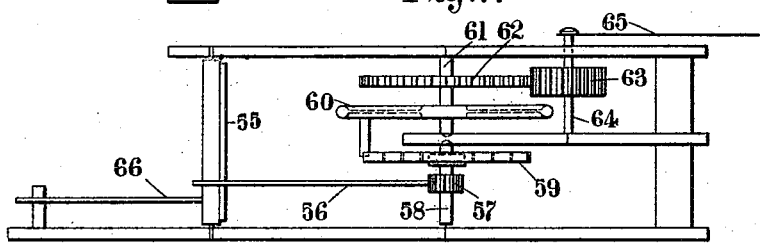

In the modification shown in Figs. 6 and 7 the armature 55 is rocked as already described but its oscillations are conveyed through a toothed quadrant 56 to a pinion 57 fixed on spindle 58 which carries a coil or balance spring 59 connected to balance wheel 60 on spindle 61 which carries wheel 62 meshing with pinion 63 on the spindle 64 of the pointer 65. Spring 66 is the equivalent of 10 in its action on the armature.

In this modification the quadrant 56 turns the balance wheel 60 through the medium of the spring. It is assumed that the natural period of oscillation of the balance 60 under the influence of the spring 59 is considerably greater than the rate of movement of the quadrant. The spring tendency is then to set the balance in position of equilibrium with respect to the periods of flexion and de-flexion (reverse flexion) of the spring. In this modification the natural period of recoil of the armature 55 under the influence of the spring 66 is assumed to be in proportion to the number of oscillations of the armature in a given time.

And it has been found that with impulses of relatively short duration, the inertia of the armature with respect to the strength of the recoil spring may be so arranged that, the armature continuing its movement after cessation of impulse and recoiling under effect of spring, will oscillate in a time approximately uniform, with respect to considerable variations of amplitude and periodicity of impulse, so that ratio of the time during which the armature is at rest to that during which it is in motion is directly proportionate to the speed.

For the purpose of generating an intermitten current I may use any suitable device such as that shown in Figs. 8 to 11.

Figure 8:
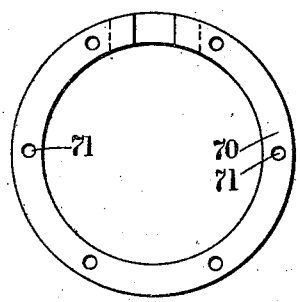
Figs. 8, 9, 10 and 11 show details connected with magneto electric constructions for use on some rotary part, say the wheel, of the car.
Figure 10:
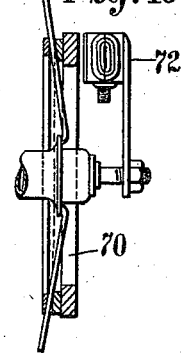
Figure 9:
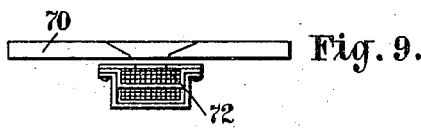

In Figs. 8, 9 and 10 I have shown a broken ring 70 having fixing holes 71 and adapted to be attached to a wheel, say a road wheel such as partly shown in Fig. 10. Adjacent this ring I mount a bobbin-system 72 of any suitable kind adapted to generate current when the gap in the broken ring passes. More than one gap may be used filled with non-magnetic material.

Figure 11:
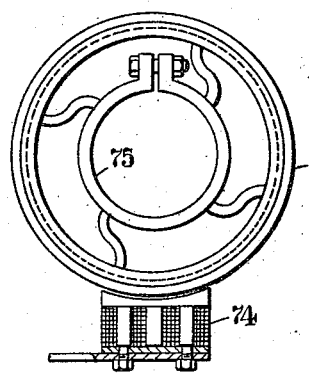

In Fig. 11 a modification is made in that the ring 73 has the bobbin 74 fixed adjacent its periphery instead of at the side as seen in Figs. 8 to 10. The ring is mounted on a non-magnetic spider 75 having a split boss by which it can be attached to a shaft or equivalent.

What I claim is:

1. In a speedometer, an armature pivoted intermediate its ends, an electromagnet influencing the respective ends of the armature in the same rotative direction to cause said armature to swing on its pivot, means for producing periodic electric impulses in said electromagnet, a spring strip secured to the armature in line with the pivot and depending below the same, means for fixing that end of the strip remote from the armature against movement in response to armature movement, said spring being tensioned by the movement of the armature in response to the energization of the electromagnet, an indicator, a balance gear connected thereto, and means carried by the armature to cooperate with and operate said gear in the movement of the armature responsive to the tension of the spring strip following de-energization of the electromagnet.

2. In a speedometer, an armature pivoted intermediate its ends, an electromagnet influencing the respective ends of the armature in opposite directions to cause said armature to swing on its pivot, means for producing periodic electric impulses in said electromagnet, a spring strip secured to the armature in line with the pivot and depending below the same, means for fixing that end of the strip remote from the armature against movement in response to armature movement, said spring being tensioned by the movement of the armature in response to the energization of the electromagnet, an indicator, a balance gear connected thereto, an arm rising from the armature in line with the pivot and a spring controlled click carried by the arm and adapted to engage and operate said balance gear in those movements of the armature responsive to the tension of the spring strip.

3. In a speedometer, an armature pivoted intermediate its ends, an electromagnet influencing the respective ends of the armature in opposite directions to cause said armature to swing on its pivot, means for producing periodic electric impulses in said electromagnet, a spring strip secured to the armature in line with the pivot and depending below the same, means for fixing that end of the strip remote from the armature against movement in response to armature movement, said spring being tensioned by the movement of the armature in response to the energization of the electromagnet, an indicator, a balance gear connected thereto, an arm rising from the armature in line with the pivot and a spring controlled click carried by the arm and adapted to engage and operate said balance gear in those movements of the armature responsive to the tension of the spring strip, said click being mounted to remain in cooperation with the gear during the movement of the armature under the influence of the electromagnet.

4. In a speed indicator of the character specified, an annular electromagnet, a pair of pole pieces secured one at each end of the electromagnet, means for imparting a series of electric impulses to the electromagnet, an armature pivotally mounted between said pole pieces and adapted to be attracted simultaneously by both of said pole pieces when the electromagnet is energized, a limb secured to said armature, a spring actuated pawl mounted on said limb, a blade spring secured at one end to said limb, said spring being adapted to return the limb and armature to their normal position, a ratchet wheel, the pawl being adapted to ride over said ratchet wheel without driving the same when the armature is attracted and to engage with and positively drive said ratchet wheel when the armature is returned to its normal position by said spring so that the ratchet wheel will be driven by a uniform power at each operation of the limb and armature by the spring irrespective of the attraction exerted on the armature by the pole pieces, a spindle on which the ratchet wheel is mounted, a balance wheel and pinion on said spindle, a second spindle, a recoil spring, a pinion and a toothed wheel on said second spindle, the toothed wheel gearing with the first mentioned pinion, a third spindle, a toothed wheel mounted on said third spindle and gearing with the second mentioned pinion, a coil spring connecting the second mentioned toothed wheel to said third mentioned spindle, a balance wheel and a pinion on the third spindle, a fourth spindle, and a toothed wheel and a pointer mounted on said fourth mentioned spindle, said third mentioned toothed wheel gearing with said third mentioned pinion.

5. A speedometer including an indicator, a spring controlled gear connected thereto, an armature, an electromagnet for operating the armature in one direction, a spring for operating the armature in the other direction, and a click carried by the armature to cooperate with the gear, said click operating the gear against its spring in those movements of the armature responsive to the spring strip, and means for supporting the click to cause the same to automatically engage with the gear during the movements of the gear responsive to its spring and while the armature is being operated by the electromagnet.

In witness whereof I have hereunto set my hand.

ARTHUR MACDONALD COX.